United States Patent [19]

Agrawal et al.

[11] Patent Number: 5,623,483
[45] Date of Patent: Apr. 22, 1997

[54] SYNCHRONIZATION SYSTEM FOR NETWORKED MULTIMEDIA STREAMS

[75] Inventors: Prathima Agrawal; Balakrishnan Narendran, both of New Providence, N.J.; Narayanan Shivakumar, Stanford, Calif.; Cormac J. Sreenan, Green Village, N.J.

[73] Assignee: Lucent Technologies Inc., Murray Hill, N.J.

[21] Appl. No.: 439,041

[22] Filed: May 11, 1995

[51] Int. Cl.$^6$ ........................................ H04J 3/06
[52] U.S. Cl. ............................. 370/253; 370/519
[58] Field of Search ........................ 370/17, 60, 94.1, 370/94.2, 108

[56] References Cited

U.S. PATENT DOCUMENTS

| | | | |
|---|---|---|---|
| 4,071,706 | 1/1978 | Warren | 370/108 |
| 4,817,085 | 3/1989 | DePrycker | 370/60 |
| 5,127,000 | 6/1992 | Henrion | 370/60 |
| 5,140,417 | 8/1992 | Tanaka et al. | 358/133 |
| 5,164,938 | 11/1992 | Jurkevich et al. | 370/60 |
| 5,274,680 | 12/1993 | Sorton et al. | 375/118 |
| 5,282,215 | 1/1994 | Hyodo et al. | 371/42 |
| 5,301,193 | 4/1994 | Toyofuku | 370/94.1 |
| 5,317,562 | 5/1994 | Nardin et al. | 370/16 |
| 5,381,404 | 1/1995 | Sugano et al. | 370/13 |
| 5,381,408 | 1/1995 | Brent et al. | 370/60 |
| 5,412,642 | 5/1995 | Nunokawa | 370/17 |
| 5,440,562 | 8/1995 | Cutler, Jr. | 370/108 |
| 5,483,523 | 1/1996 | Nederlof | 370/58.3 |

OTHER PUBLICATIONS

Ades, S., et al., "Protocols for Real Time Voice Communication on a Packet Local Network," Proceedings of IEEE ICC '86, Jun. 1986, pp. 525–530.

Alvarez–Cuevas, F., et al., "Voice Synchronization in Packet Switching Networks," IEEE Network, Sep. 1993, pp. 20–25.

Barberis, G., and Pazzaglia, D., "Analysis and Optimal Design of a Packet–Voice Receiver," IEEE Transactions on Communications, vol. COM–28, No. 2, Feb. 1980, pp. 217–227.

Escobar, J., et al., "Flow Synchronization Protocol," Proceedings GlobeCom '92, 1992, pp. 1381–1387.

Li, L., et al., "Synchronization in Real Time Multimedia Data Delivery," Proceedings of IEEE ICC '92, Jun. 1992, pp. 587–591.

Mills, D., "Internet Time Synchronization: The Network Protocol," IEEE Transactions on Communications, vol. 39, No. 10, Oct. 1991, pp. 1482–1493.

Montgomery, W.A., "Techniques for Packet Voice Synchronisation," IEEE Journal on Selected Areas in Communications, vol. SAC–1, No. 6, Dec. 1983, pp. 1022–1028.

Ramjee, R., et al., "Adaptive Playout Mechanisms for Packetized Audio Applications in Wide–Area Networks," Proceedings of IEEE INFOCOM '94, Jun. 1994, pp. 680–688.

Ravindran, K., and Bansal, V., "Delay Compensation Protocols for Synchronization of Multimedia Data Streams," IEEE Transactions on Knowledge and Data Engineering, vol. 5, No. 4, Aug. 1993, pp. 574–589.

Swinehart, D.C., et al., "Adding Voice to an Office Computer Network," Proceedings of IEEE GlobeCom '83, Nov. 1983, pp. 392–398. Also available as Xerox PARC technical report CSL–83–8, Feb. 1983.

(List continued on next page.)

Primary Examiner—Douglas W. Olms
Assistant Examiner—Matthew C. Phillips

[57] ABSTRACT

A network data stream synchronization method and system are disclosed. Operating delay and loss parameters are accepted and a data stream buffer is initialized. The network delay experienced by a data packet is determined and a buffer delay is imposed to provide a fixed end-to-end delay. Packets arriving too late to be played within the fixed end-to-end delay are discarded. Network delay models may be updated and clock drifts may be detected and compensated for using historical buffer data.

37 Claims, 2 Drawing Sheets

OTHER PUBLICATIONS

Yavatkar, R., "MCP: A Protocol for Coordination and Temporal Synchronization in Multimedia Collaborative Applications," Proceedings of IEEE International Conference on Distributed Computing Systems, Jun. 1992, pp. 606–613.

Zarros, P., et al., "Statistical Synchronization Among Participants in Real–Time Multimedia Conference," Proceedings of IEEE INFOCOM '94, Jun. 1994, pp. 912–919.

MULTI-STREAM

SYNCHRONIZATION SYSTEM FOR NETWORKED MULTIMEDIA STREAMS

FIELD OF THE INVENTION

The present invention relates generally to the field of digital data communication networks, and more specifically to synchronization methods and apparatus for synchronizing the delivery of data packets received over such networks.

BACKGROUND OF THE INVENTION

The use of packet based communication networks to transport digitized streams of audio and video is becoming increasingly common. The characteristics of these networks are such that the total delay experienced by each data packet is a function of variable delays due to physical media access, relay queuing, and choice of routes in addition to fixed propagation delays. The result is that the time difference between transmitting any two packets at the source is unlikely to be the same as that observed between their arrival at the destination. The delay variations (known as jitter) are a particular problem for a stream of multimedia packets, because the jitter can have an impact on the audiovisual quality as perceived by a human user. Delay is also a problem when using multiple related streams, because it introduces a temporal difference which is undesirable in situations where, for example, lipsynch is required. To solve the synchronization problems, one must introduce additional delay by buffering packets at or near the point of presentation. In the single stream case, this is used to smooth out jitter prior to passing data samples to an output device. For multiple related streams it is used to compensate for inter-stream delay differences. For real time applications such as conferencing and telephony, large delays are detrimental to interactivity. For example, in packetized voice applications, the maximum acceptable end-to-end delay is in the 150 to 250 millisecond range.

Two approaches to synchronizing data packets are known as packet preserving and time preserving. In the former, the receiver waits until the packet arrives to play the packet back, thus all packets are played. In the latter time preserving method, if a packet does not arrive within a certain time boundary, the packet is assumed to be lost and subsequent packets are played back. If the lost packet does arrive later it is thrown away. With the packet preserving approach buffer requirements are large and the end-to-end delay between transmission and playback can be high. The time preserving approach can result in a large number of uncontrolled losses. As mentioned, some applications are sensitive to end-to-end delay and most are affected by losses. Neither approach is suitable for use with a wide range of applications.

As a result there is a need for a network data stream synchronization system able to satisfy a wide range of application and user requirements and configurable to operate according to user or application specified delay versus loss tradeoffs.

SUMMARY OF THE INVENTION

A data stream synchronization system in accordance with one aspect of the present invention includes a configuration control circuit connected to receive stream characterization and initialization parameters including an acceptable packet loss rate. The configuration control circuit generates buffer configuration signals based upon the characterization and initialization parameters. A data buffer connected to the configuration control circuit includes a data input connected to the network, a memory circuit and a data output. The buffer configuration signals initialize a stream buffer allocating a portion of memory for packet storage and set a programmed packet delay value. During operation, the data buffer receives data packets and outputs them according to their programmed packet delay value. Packets arriving too late to be played back within the programmed delay value are discarded by the data buffer.

A method for synchronizing network stream data in accordance with another aspect of the present invention includes the steps of accepting initialization parameters and calculating the data buffer size requirements and a maximum end-to-end delay value, allocating data storage to the stream and initializing the output circuit with the data delay value, receiving data packets from the network, storing selected data packets for a selective period of time, and outputting selected data packets after the end-to-end delay is satisfied, and discarding selected data packets which arrive too late to be played before the maximum end-to-end delay is reached.

Other features and advantages of the present invention will become readily apparent to those of ordinary skill in the art by reference to the following detailed description and accompanying drawings.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
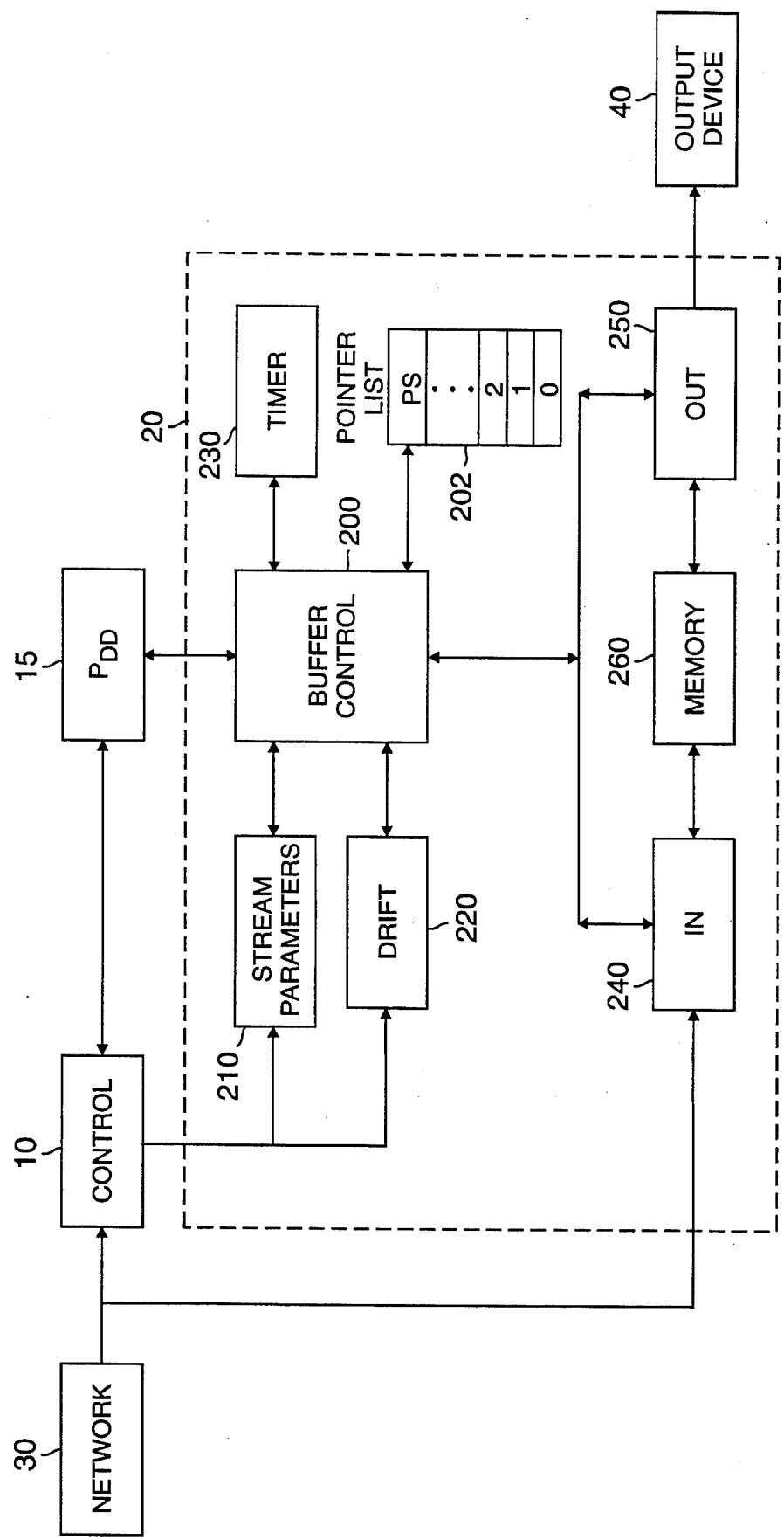
FIG. 1 is a functional block diagram of a network data stream synchronization system in accordance with one aspect of the present invention.

Referring now to FIG. 1, a data stream synchronization system in accordance with one aspect of the present invention is shown in block diagram format and will be described. The network data stream synchronization system shown in FIG. 1 includes a control circuit 10 having an input connected to the network 30. The present invention may be used with any local or wide area network. One example of a wide area network is the Internet. Network 30 in FIG. 1 symbolizes the network receiver which provides the packets to the data stream synchronization system.

Control circuit 10 configures and initializes the buffer circuit 20 to receive and process the stream data. Prior to buffer operation, a stream is characterized by the user or application using stream initialization parameters. These parameters including, the maximum packet size $S_p$ in bytes, packet rate $T_r$ (e.g. one packet every 10 milliseconds), maximum acceptable packet loss rate MPLR (e.g. 1%), and maximum acceptable delay MAD (e.g. 100 milliseconds) are specified for each stream. In a multi-stream environment, the MPLR and MAD may be specified on a per group or on a per stream basis. An additional interstream skew parameter may also be specified.

Figure 3:
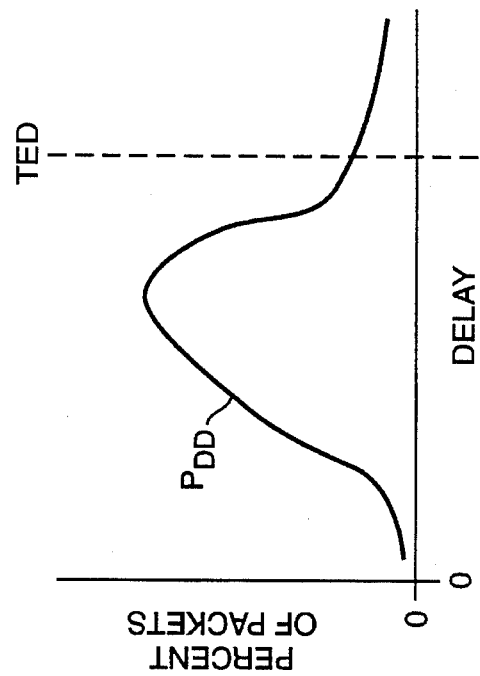
FIG. 3 is an example of a network packet delay distribution curve.

An estimate of the probable delays suffered by packets in the stream, the packet delay distribution PDD is first constructed. A PDD function may be specified for each network, for each stream, or as an overall average for all networks. The PDD is expressed as the percentage of packets expected to experience a particular delay measured from transmission from the source to receipt by the receiver. A typical network PDD curve is shown in FIG. 3.

The PDD is formulated using delay information provided by the network administrator, the user, and the transmission source. Alternatively, PDD data may be developed over time by control circuit 10 or specified as an initial approximation. In any event, control circuit 10 may update the PDD model based upon actual packet delays experienced during buffer operation. The PDD models are stored at block 15 in FIG. 1 as a look-up table of values or as a function which is periodically evaluated by a suitable processor.

Control circuit 10 calculates a set of buffer configuration parameters for each data stream and allocates buffer resources for each stream, including a packet data storage block 260, buffer control 200, delay timer 230, pointer list 202, and input and output controllers 240 and 250.

Control circuit 10 calculates a total end-to-end delay value TED for each stream. Referring to FIG. 3, a dashed vertical line labeled TED is drawn on the PDD curve. It will be appreciated from the PDD curve that as the TED is decreased (the TED line is moved to the left) an increasingly greater percent of packets will experience a delay greater than or equal to the TED. Assuming that packets which experience a delay greater than the TED will be discarded, it will also be appreciated that the PLR will increase as the TED is decreased. Thus, the minimum value for the TED is limited by the maximum packet loss rate MPLR specified for the stream as a function of the PDD. On the other hand, the maximum value for the TED is limited by the maximum acceptable delay value MAD specified for the stream.

Control circuit 10 thus calculates the operating TED for the stream based upon the MPLR, MAD, and PDD. The TED may be chosen to minimize the packet loss rate (PLR) which results in a TED equal to the MAD; to minimize the TED which results in a PLR equal to the MPLR; or by a hybrid function of TED and MPLR.

Control circuit 10 calculates the buffer size requirements for the stream using the packet size $S_p$, packet rate $T_r$, and the total end-to-end delay TED. First, the maximum buffer delay $BD_{max}$ is calculated by subtracting the minimum network delay $ND_{min}$ from the TED.

$$BD_{max} = TED - ND_{min}$$

Next, dividing the maximum buffer delay $BD_{max}$ by the packet rate $T_r$ yields the maximum number of packets PS that the buffer needs to accommodate i.e., the number of packet slots in the buffer 20.

$$PS = BD_{max}/T_r$$

The buffer size in bytes $S_B$ is then the product of the packet size $S_p$ and the number of packet slots PS.

$$S_B = PS \times S_p$$

Control circuit 10 allocates a block of memory 260 having $S_B$ bytes and a pointer list 202 having PS slots for buffering each stream. Control circuit 10 also allocates and initializes buffer control circuits 200 for the stream. As shown in FIG. 1, an input controller 240 and an output controller 250 are allocated to the stream buffer 20. As discussed in further detail below, input and output controllers 240 and 250 respectively transfer data between the network 30 or output device 40 and the buffer memory 260. Buffer control 200 contains all of the logic circuits necessary to oversee operation of the buffer 20 and to provide updated network delay information to control circuit 10.

Buffer control 200 maintains a packet pointer for each data packet stored in the buffer 20. Each packet pointer contains the starting address in memory 260 of its respective packet. The pointers are stored by buffer control 200 in pointer list 202 which has a fixed number (equal to PS) of slots for storing packet pointers. Buffer control 200 manipulates pointer list 202 as a shift register with PS slots, numbered 0 through PS-1. The zeroth slot 0 (the output slot) contains the pointer for the packet which is to be output next. The contents of each slot is shifted into the next adjacent slot towards the output slot 0, at the packet rate i.e., every $T_r$ seconds. Stated differently, every $T_r$ seconds, the pointer in the ith slot is moved into the (i−1)st slot. The buffer delay for a packet in the buffer is determined by the position of its pointer in the pointer list 202. A packet whose pointer is in the 3rd slot will experience a buffer delay of $3T_r$ seconds.

As each packet is received by buffer circuit 20, the proper location for storing the packet in the buffer memory is determined by buffer control circuit 200 which passes a packet pointer, i.e. a starting address for the location in memory where the packet data will be stored, to input circuit 240. Input circuit 240 stores the packet data in memory starting at the pointer address as the data is received from network 20.

The starting address is also stored as a packet pointer in the pointer list 202 at a slot location determined as follows by buffer control circuit 200. Upon receipt of the first arriving packet in the stream, with sequence number i, the network delay suffered by the packet $ND_i$ is calculated and the slot position of the packet pointer in the pointer list 202 is determined. As a practical matter, the packet data can be placed in any unused buffer memory location since only the location of the pointers in the pointer list 202 are manipulated to control the delay and output sequence of the packets. The packet data is preferably not shifted from one location to another in memory 260. The pointer is stored in slot number k, where k is equal to the integer value of the buffer delay $BD_i$ for the packet i divided by the packet rate $T_r$.

$$k = BD_i/T_r$$

The buffer delay $BD_i$ for packet i is simply the difference between the total end-to-end delay TED and the network delay $ND_i$ suffered by packet i, $ND_i$.

$$BD_i = TED - ND_i$$

The packet pointer for the first packet with sequence i is thus placed in the kth slot of pointer list 202 as determined by the following relationship.

$$k = (TED - ND_i)/T_r$$

If the network delay is greater than the total end-to-end delay ($ND_i > TED$), the packet arrived too late to be played and is discarded by control circuit 200.

For subsequent packets, the pointers may be placed in the pointer list at slot locations determined by the packet sequence. Thus, if packet i+2 is received after the first packet i, it is placed 2 slots higher in the list than the present location of the pointer for packet i. Conversely, if packet i–2 is received after packet i, it is placed 2 slots lower in the list than the present location of the pointer for packet i, provided that packet i–2 is not earlier in the sequence than the packet last output by output circuit 250. The use of packet sequence information to select slot locations causes out of order packets to be re-ordered without moving packet data.

Control circuit 200 checks the sequence number of each packet being received against the sequence number of the packet last output by output circuit 250. If the sequence number of the incoming packet is lower than the packet last output by the buffer, the packet being received is discarded because it has arrived too late to be output in sequence. Buffer control 200 maintains a last-played register to keep track of the last packet output for this purpose. When the stream is first initialized, buffer control 200 sets the last output sequence number in the last-played register to a value smaller than the first packet received. It does this to allow for the possibility that the first packet received is not the first in the stream sequence. Buffer control 200 sets the last-played register to the sequence number i of the first packet received reduced by the number of slots k its pointer is offset from the output slot. Thus, last-played is set to i–k when the first packet i is received.

In response to a signal from timer 230, buffer control 200 sends the pointer contents of the output slot 0 in the pointer list 202 to output control 250 which then moves the packet data stored at the respective memory location to the output device 40. With each signal from timer 230, buffer control also shifts each pointer down one slot in the pointer list as described above. Normally, timer 230 is set to generate a signal at the packet rate i.e., every $T_r$ seconds, to ensure that the playback rate for the packets is the same as the packet rate. When the first packet i is received, however, buffer control 200 adjusts timer 230 to the packet rate $T_r$ less the remainder of the ratio of the buffer delay $BD_i$ to the packet rate $T_r$. Buffer control 200 makes this adjustment with the first packet to ensure that the TED is exactly met for the first packet. The initial timer setting is therefore defined by the following relationship.

$$\text{Timer} = T_r - (BD_i \bmod T_r)$$

The network delay ND for each packet can be determined using synchronized clocks at the transmitter and receiver. Then a time stamp placed on each packet when it is produced allows easy computation of the network delay. As previously described, only the network delay of the first packet received $ND_i$ is necessary since packet sequence numbers may be used to position the packet pointers in the pointer list after the first packet pointer has been positioned.

Alternatively, a special control packet may be used to estimate the actual network delay of the first packet in a stream. This special control packet is transmitted as part of the stream sequence and prior to the first data packet. The network must guarantee the delivery of this special control packet within a specified tolerance $\lambda$ of the minimum network delay $ND_{min}$. This packet, when received is given the maximum buffer delay $BD_{max}$ and its pointer is put in the last slot PS-1 in the pointer list. If the tolerance $\lambda$ is less than the packet rate $T_r$, then the resulting TED will be no more than $\lambda$ greater than the calculated TED.

If $\lambda$ is greater than $T_r$, initially the resulting TED is still no more than $\lambda$ greater than the calculated TED, however the accuracy of the resulting TED can be improved over time. Whenever a new packet arrives, it is inserted into the appropriate slot offset from the last-played packet. If the computed slot is greater than the buffer size, by m slots, all packets in the buffer are shifted towards the output end by m slots so that the new packet may be accommodated. The packets in the m slots closest to the output are therefore discarded because they have suffered excessive delay relative to the new packet.

Buffer control circuit 200 may time stamp the receipt and the output of each packet. Using the difference which is equal to the buffer delay, buffer control circuit 200 may calculate the network delay ND for each packet by subtracting the buffer delay BD from the total end-to-end delay TED. Using the calculated network delays, the PDD model stored in PDD memory may be updated by control circuit 10 to reflect changing network operating characteristics. Control circuit 10 may also update the buffer operating characteristics, i.e., TED, buffer size, and pointer list in response to a changing PDD or PLR. The user application may be given access to the PDD data to change the buffer size based upon the application requirements.

If the rate of production of packets is faster than the rate that each packet is serviced by the output device 40, buffer overrun would result. Drift control 220 maintains stream synchronization in the presence of such clock drifts between the transmitter and output device 40 by discarding a packet periodically to prevent buffer overflow. If the receiver clock is faster than the transmitter, drift control circuit 220 causes a packet to be repeated periodically or outputs a blank or dummy packet so that the output device 40 always has a packet to process.

MULTI-STREAM SYNCHRONIZATION

Figure 2:
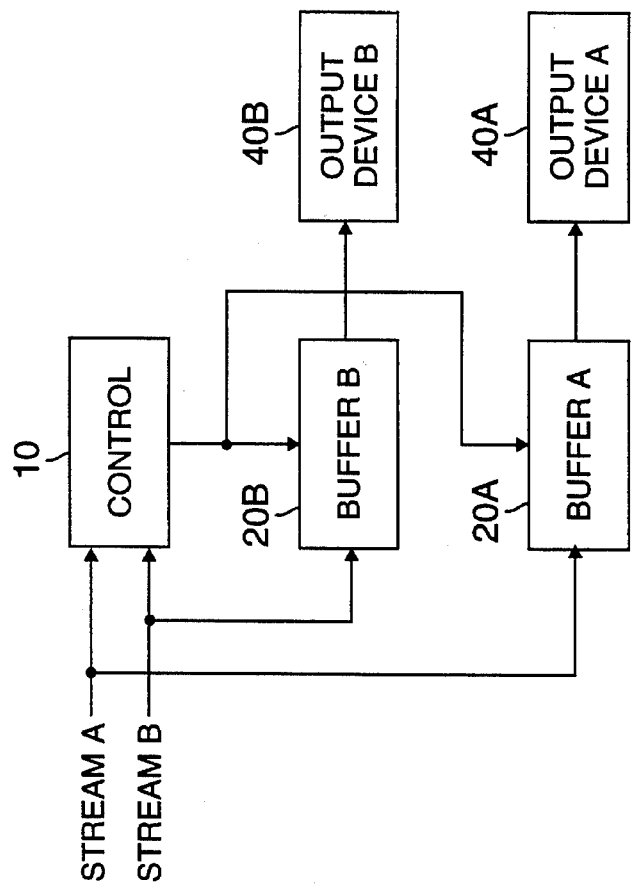
FIG. 2 is a functional block diagram of a multistream data synchronization system in accordance with another aspect of the present invention.

The present invention may also be used to synchronize multiple data streams. Referring to FIG. 2, a block diagram of a two-stream implementation is shown. A single control circuit 10 configures and initializes a buffer circuit 20A and 20B for each data stream A, B in much the same manner as the above described single stream example. The data streams may be received over the same network or over different networks. Similarly, the data may be delivered to a single output device or to two separate output devices. In FIG. 2, two separate output devices 40A and 40B are shown.

A simple multistream hardware implementation may consist of a microcomputer or microcontroller with support circuitry operating as control circuit 10 keeping track of all of the stream parameters and buffer requirements and resources. The buffer circuits may consist of a block of memory for buffer memory 260; a multiple-channel programmable direct memory access DMA controller for the multiple input and output circuits 240 and 250; and the pointer lists 202 may be located either in the microcontroller RAM or in a portion of the memory block; timers 230 may also be integral to the microcontroller.

In such a system, control circuit 10 would allocate a portion of the buffer resources to each stream. For example, two DMA channels can be allocated to each stream, one for input control 240 and one for output control 250. A segment of the memory block having at least $S_B$ bytes would be allocated for the stream buffer memory 260. The buffer control functions could be assigned to the control circuit 10 microcontroller in less demanding applications, or another microcontroller can be supplied to perform the buffer functions. The use of such dynamically configurable buffer hardware allows control circuit 10 to open and close many buffer circuits 20 in response to varying stream synchronization requirements. Alternatively, custom or discrete logic may be used to implement the various functions outlined above.

The present invention may also be used to synchronize inter-related streams of data from one or more networks to be output to one or more output devices. As in the single stream case, each stream in the group of interrelated streams is characterized by the MAD, MPLR, $S_p$, and $T_r$ initialization parameters. In addition, interstream parameters may be specified such as interstream skew $\alpha$ which specifies the maximum acceptable delay between the packets of two interrelated streams.

Considering the two stream example shown in FIG. 2, the interrelated two stream implementation will now be described. Control circuit 100 first calculates the minimum total end-to-end delay for each of the streams A and B, $TED_A$ and $TED_B$, setting the packet loss rates $PLR_A$ and $PLR_B$ equal to the maximum acceptable packet loss rates, $MPLR_A$ and $MPLR_B$. The largest of the calculated TEDs, $TED_{max}$ is then chosen to satisfy the MPLR of each stream. If $TED_{max}$ is greater than the maximum acceptable delay of any of the streams, $MAD_A$ or $MAD_B$, there is no feasible solution. Otherwise, $TED_{max}$ is used for each stream ($TED_A = TED_B = TED_{max}$) and the buffer requirements are calculated as before. The maximum buffer delay for each stream is the chosen total end-to-end delay less the minimum network delay for that stream.

$$BD_{max_A} = TED_{max} - ND_{min_A}$$

Similarly, the number of packet slots in the buffer and in the pointer list are calculated by dividing the maximum buffer delay by the packet rate for each stream.

$$PS_A = BD_{max_A}/T_{r_A}$$

The buffer size in bytes is calculated by multiplying the number of packet slots by the packet size for each stream.

$$S_{B_A} = PS_A \times S_{P_A}$$

Once initialized, each buffer operates independently as described above for the single stream case.

In some applications, streams have less strict synchronization constraints. For example, an application may require audio streams to be synchronized with the video stream within a 100 millisecond tolerance. In such a case, the application would specify an interstream skew $\alpha$ of 100 milliseconds. The interstream skew provides an extra degree of freedom allowing satisfaction of otherwise infeasible requirements. In such case, control circuit 10 calculates the buffer configuration parameters for streams A and B as described above. However, $TED_{max}$ is reduced by $\alpha$ before comparison with the several MAD values. If $TED_{max}$ decreased by $\alpha$ is less than all of the MAD values then a solution is feasible and the individual operating TEDs, $TED_{oper.A}$ and $TED_{oper.B}$ are chosen. $TED_{oper.}$ for each stream is calculated as a function of $TED_{max}$, $\alpha$ and its respective MPLR and MAD. Each operating TED, $TED_{oper.A}$, $TED_{oper.B}$ must satisfy two range criteria. First, it must be less than its respective MAD and greater than its respective TED values.

$$TED_A \leq TED_{oper.A} \leq MAD_A$$

$$TED_B \leq TED_{oper.B} \leq MAD_B$$

Second, each operating TED must be less than $TED_{max}$ and greater than $TED_{max} - \alpha$.

$$TED_{max} - \alpha \leq TED_{oper.} \leq TED_{max}$$

It is possible to operate the set of buffers to reflect a particular type of interdependency between the streams to be synchronized. Consider, for example, a situation where if a packet expected for a given stream is late, then the corresponding packets in the other streams should be discarded rather than played. This functional result can be achieved using the present invention by combining the individual stream PDDs to form a joint PDD and calculating a TED as above to satisfy a single $PLR_{system}$, which is defined as the PLR for all streams in the set. Another situation is where one stream is designated the master stream and the rest of the streams are designated slaves. All received packets of the slaves are thrown away if the master's packet is not received or is discarded. If the master packet is received then all of the slave packets are played with the master packet. In this case the $PLR_{system}$ is set equal to the $PLR_{master}$ and the $PLR_{slaves}$ are set equal to 100%. It is also possible to synchronize a set of streams which are duplicates of each other, and such that a given packet can be played back from any one of the streams. The use of such redundant streams is useful for transmitting critical data.

From the foregoing description, it will be apparent that improvements in network data stream synchronization systems and methods have been provided to satisfy delay and loss tradeoffs. While preferred embodiments have been described, it should be appreciated that variations and modifications of the herein described system and methods, within the scope of the invention will be apparent to those skilled in the art. Accordingly, the foregoing description should be taken as illustrative and not in a limiting sense.

We claim:

1. A data stream synchronization system comprising:

a configuration control circuit having an input connected to receive initialization parameters, said initialization parameters including an acceptable packet loss rate (APLR) which comprises an acceptable rate for purposefully discarding packets;

a data buffer having a data input connected to receive data from a network and a data output connected to provide data to one or more receivers;

said configuration control circuit, having an output connected to said data buffer for sending buffer configuration signals to said data buffer;

said configuration control circuit calculates a first total end-to-end delay (TED) value as a function of said APLR and sends a first buffer configuration signal generated as a function of said first TED value to said data buffer;

said data buffer initializes a first stream buffer in response to said first buffer configuration signal;

said data comprising one or more data streams each having a first data packet and a plurality of subsequent data packets, each said data packet having a packet ID indicative of a respective position within said data stream;

said data buffer receives said data packets and outputs said data packets according to said first TED value and said packet ID, said data buffer discarding selected ones of said data packets arriving too late to be output within said TED.

2. The data stream synchronization system of claim 1 wherein:

said initialization parameters further comprise a maximum acceptable delay (MAD); and said configuration control circuit calculates said first TED value as a function of said APLR and said MAD.

3. The data stream synchronization system of claim 1 wherein:

said data buffer calculates a buffer delay for said first data packet, said buffer delay representing the excess of said TED value over an initial network delay suffered by said first data packet;

said data buffer outputs said first data packet after said first data packet has been held in said buffer for said buffer delay; and said buffer circuit discards said data packets suffering from a network delay greater than said TED value.

4. The data stream synchronization system of claim 3 wherein:

said data packets further comprise time stamp information; and said data buffer calculates said initial network delay suffered by said first data packet using said time stamp information.

5. The data stream synchronization system of claim 3 wherein:

said first data packet is a special control packet delivered to said data stream synchronization system within a guaranteed tolerance of a minimum network delay; and said data buffer stores said data packet in a buffer slot representative of a maximum buffer delay.

6. The data stream synchronization system of claim 3 wherein:

said data buffer calculates said actual network delay suffered by said first one of said data packets using network delay information provided by said network.

7. The data stream synchronization system of claim 1 further comprising:

a network delay distribution circuit having an output connected to said configuration control circuit for supplying network delay probability data to said configuration control circuit;

said configuration control circuit calculates said first TED value as a function of said APLR and said network delay probability data.

8. The data stream synchronization system of claim 7 wherein:

said network delay probability data comprises statistical estimates of probable packet delays.

9. The data stream synchronization system of claim 1 further comprising:

a drift detector having an input connected to said data buffer circuit for monitoring trends in the utilization of said data buffer;

said drift detector detects a rate drift between a sender packet rate and a receiver packet rate, said sender packet rate being representative of the rate at which said data packets are generated by a sender and said receiver packet rate being representative of the rate at which said data packets are accepted by said receiver.

10. The data stream synchronization system of claim 9 wherein:

said drift detector monitors trends in the number of said data packets stored in said data buffer.

11. The data stream synchronization system of claim 9 further comprising:

an adjustable rate clock having an output connected to said one or more receivers for providing a timing signal to synchronize said receiver with said sender;

said adjustable rate clock having an input connected to said drift detector for receiving a rate drift adjustment signal representative of said rate drift and operative to adjust said timing signal to reduce said rate drift.

12. A data stream synchronization system comprising:

a configuration control circuit having an input connected to receive initialization parameters, said initialization parameters including an acceptable packet loss rate (APLR);

a data buffer having a buffer control circuit, a data input connected to said network, a memory connected to said data input and to a data output, and an output circuit;

said configuration control circuit, having an output connected to said buffer control circuit, generates buffer configuration signals responsive to said initialization parameters and sends said buffer configuration signals to said buffer control circuit;

in response to said buffer configuration signals, said buffer control circuit initializes a first stream buffer having a selected portion of memory allocated thereto and a programmed packet delay value;

said data packets each having a packet ID indicative of a respective position within said data stream;

said data buffer receives said data packets and outputs said data packets according to said programmed packet delay value and said packet ID, said data buffer discarding selected ones of said data packets arriving too late to be output within said programmed delay value;

said data stream comprises a series of said data packets, including a first data packet and one or more subsequent data packets;

said data buffer determines an initial network delay representative of the delay experienced by said first data packet in being transmitted from the source to said data buffer;

said data buffer determines an initial buffer slot for storing said first data packet as a function of said initial network delay and said programmed packet delay value; and said data buffer determines respective buffer slots for storing said one or more subsequent data packets as a function of said packet IDs and a present location of data packets in said data buffer.

13. A data stream synchronization system for synchronizing delivery of data received from one or more senders over one or more networks in one or more data streams comprising:

a configuration control circuit having an input connected to receive initialization parameters for said one or more data streams;

said initialization parameters comprising an acceptable packet loss rate (APLR) which comprises an acceptable rate for purposefully discarding packets and a maximum acceptable delay (MAD);

a data buffer having an input connected to receive said data from said one or more networks, and an output connected to provide data to one or more data receivers;

said configuration control circuit having an output connected to said data buffer for sending buffer configuration signals to said data buffer;

said configuration control circuit calculates a first total end-to-end delay (TED) value as a predetermined function of said APLR and said MAD and sends a first buffer configuration signal generated as a predetermined function of said first TED value to said data buffer;

said data buffer initializing a stream buffer for each of said one or more data streams in response to said first buffer configuration signal;

said one or more data streams each comprising a series of data packets including a first data packet and a plurality of subsequent data packets;

for each of said first data packets, said data buffer selectively determines an initial network delay suffered by the respective one or ones of said first data packets and calculates a buffer delay representing the excess of said TED value over said network delay;

said data buffer outputs said first data packet after said first data packet has been held in said stream buffer for said buffer delay;

said data buffer selectively discards said data packets received with a respective network delay greater than said TED value.

14. The data stream synchronization system of claim 13 further comprising:

a network delay distribution circuit having an output connected to said configuration control circuit for supplying network delay probability data to said configuration control circuit; and said predetermined function is also a function of said network delay probability data.

15. A data stream synchronization system comprising:

a configuration control circuit having an input connected to receive initialization parameters, said initialization parameters including an acceptable packet loss rate (APLR);

a data buffer having a data input connected to receive data from a network and a data output connected to provide data to one or more receivers;

said configuration control circuit, having an output connected to said data buffer for sending buffer configuration signals to said data buffer;

said configuration control circuit calculates a first total end-to-end delay (TED) value as a function of said APLR and sends a first buffer configuration signal generated as a function of said first TED value to said data buffer;

said data buffer initializes a first stream buffer in response to said first buffer configuration signal;

said data comprising one or more data streams each having a first data packet and a plurality of subsequent data packets, each said data packet having a packet ID indicative of a respective position within said data stream;

said data buffer receives said data packets and outputs said data packets according to said first TED value and said packet ID, said data buffer discarding selected ones of said data packets arriving too late to be output within said TED;

said data stream synchronization system further comprising:

a network delay distribution circuit having an input for accepting an input delay value, an output for providing a calculated packet loss rate as a function of said input delay value, and an output connected to said configuration control circuit for supplying network delay probability data to said configuration control circuit with said configuration control circuit calculating said first TED value as a function of said APLR and said network probability data.

16. A data stream synchronization system comprising:

a configuration control circuit having an input connected to receive initialization parameters, said initialization parameters including an acceptable packet loss rate (APLR);

a data buffer having a data input connected to receive data from a network and a data output connected to provide data to one or more receivers;

said configuration control circuit, having an output connected to said data buffer for sending buffer configuration signals to said data buffer;

said configuration control circuit calculates a first total end-to-end delay (TED) value as a function of said APLR and sends a first buffer configuration signal generated as a function of said first TED value to said data buffer;

said data buffer initializes a first stream buffer in response to said first buffer configuration signal;

said data comprising one or more data streams each having a first data packet and a plurality of subsequent data packets, each said data packet having a packet ID indicative of a respective position within said data stream;

said data buffer receives said data packets and outputs said data packets according to said first TED value and said packet ID, said data buffer discarding selected ones of said data packets arriving too late to be output within said TED;

said data stream synchronization system further comprising:

a network delay distribution circuit having an input for accepting an input packet loss rate value and said network delay distribution circuit provides a calculated delay value as a function of said input packet loss rate, and an output connected to said configuration control circuit for supplying network delay probability data to said configuration control circuit;

said configuration control circuit calculates said first TED value as a function of said APLR and said network probability data.

17. A data stream synchronization system comprising:

a configuration control circuit having an input connected to receive initialization parameters, said initialization parameters including an acceptable packet loss rate (APLR);

a data buffer having a data input connected to receive data from a network and a data output connected to provide data to one or more receivers;

said configuration control circuit, having an output connected to said data buffer for sending buffer configuration signals to said data buffer;

said configuration control circuit calculates a first total end-to-end delay (TED) value as a function of said APLR and sends a first buffer configuration signal generated as a function of said first TED value to said data buffer;

said data buffer initializes a first stream buffer in response to said first buffer configuration signal;

said data comprising one or more data streams each having a first data packet and a plurality of subsequent data packets, each said data packet having a packet ID indicative of a respective position within said data stream;

said data buffer receives said data packets and outputs said data packets according to said first TED value and said packet ID, said data buffer discarding selected ones of said data packets arriving too late to be output within said TED;

said data stream synchronization system further comprising a network delay distribution circuit having an output connected to said configuration control circuit for supplying network delay probability data to said configuration control circuit;

said configuration control circuit calculates said first TED value as a function of said APLR and said network probability data;

a buffer delay trend detector having an input connected to said buffer for monitoring said buffer delays of said data packets in said data buffer;

said buffer delay trend detector having an output connected to said network delay distribution circuit for providing historical network delay data to selectively revise said network delay probability data.

18. A data stream synchronization system comprising:

a configuration control circuit having an input connected to receive initialization parameters, said initialization parameters including an acceptable packet loss rate (APLR);

a data buffer having a data input connected to receive data from a network and a data output connected to provide data to one or more receivers;

said configuration control circuit, having an output connected to said data buffer for sending buffer configuration signals to said data buffer;

said configuration control circuit calculates a first total end-to-end delay (TED) value as a function of said APLR and sends a first buffer configuration signal generated as a function of said first TED value to said data buffer;

said data buffer initializes a first stream buffer in response to said first buffer configuration signal;

said data comprising one or more data streams each having a first data packet and a plurality of subsequent data packets, each said data packet having a packet ID indicative of a respective position within said data stream;

said data buffer receives said data packets and outputs said data packets according to said first TED value and said packet ID, said data buffer discarding selected ones of said data packets arriving too late to be output within said TED;

said data stream synchronization system further comprising a drift detector having an input connected to said buffer circuit for monitoring trends in the utilization of said data buffer;

said drift detector detects a rate drift between a sender packet rate and a receiver packet rate, said sender packet rate being representative of the rate at which said data packets are generated by a sender and said receiver packet rate being representative of the rate at which said data packets are accepted by said receiver;

said drift detector monitors trends in the number of said data packets stored in said data buffer; and said data buffer discards or replays selected ones of said data packets at a predetermined discard or replay rate, said discard and replay rates being a function of said rate drift.

19. A data stream synchronization system for synchronizing delivery of data received from one or more senders over one or more networks in one or more data streams comprising:

a configuration control circuit having an input connected to receive initialization parameters for said one or more data streams;

said initialization parameters comprising an acceptable packet loss rate (ALPR) which comprises a respective APLR for each of said one or more data streams, and a maximum acceptable delay (MAD) which comprises a respective MAD for each of said one or more data streams;

a data buffer having an input connected to receive said data from said one or more networks, and an output connected to provide data to one or more data receivers;

said configuration control circuit having an output connected to said data buffer for sending buffer configuration signals to said data buffer;

said configuration control circuit calculates a first total end-to-end delay (TED) value which comprises a respective first buffer configuration signal which comprises a respective first TED value for each of said one or more data streams, for each of said one or more data streams, as a predetermined function of said APLR and said MAD and sends a first buffer configuration signal for each of said one or more data streams, generated as a predetermined function of said first TED value to said data buffer, and said configuration control circuit sends a respective second buffer configuration signal representative of a number of packet slots for said stream buffer to said data buffer, said data buffer configuring said respective stream buffer to comprise said number of packet slots for storing said data packets with said number of packet slots being a predetermined function of said initialization parameters and said respective first TED value;

said data buffer initializing a stream buffer for each of said one or more data streams in response to said first buffer configuration signal;

said one or more data streams each comprising a series of data packets including a first data packet and a plurality of subsequent data packets;

for each of said first data packets, said data buffer selectively determines an initial network delay suffered by the respective one or ones of said first data packets and calculates a buffer delay representing the excess of said TED value over said network delay;

said data buffer outputs said first data packet after said first data packet has been held in said stream buffer for said buffer delay;

said data buffer selectively discards said data packets received with a respective network delay greater than said TED value.

20. The data synchronization system of claim 19 further comprising:

a stream group including a plurality of member streams having a predetermined inter-relationship, said member streams comprising selected ones of said one or more data streams; and said configuration control circuit determines a group TED value as a predetermined function of said respective first TED values for each of said member streams; and said respective first buffer configuration signals are representative of said group TED value.

21. The data synchronization system of claim 20 wherein:

said configuration control circuit compares said group TED value with said respective MAD for each of said member streams and generates a signal in response to said group TED being greater than any of said respective MAD of said member streams.

22. The data synchronization system of claim 19 further comprising:

a stream group including a plurality of member streams having a predetermined inter-relationship, said member streams comprising selected ones of said one or more data streams;

said initialization parameters further comprise an inter-stream skew parameter for said stream group;

said configuration control circuit determines a group TED value as a predetermined function of said respective first TED values for each of said member streams; and said respective first buffer configuration signals are determined as a function of said group TED value, said interstream skew parameter, said respective APLR, and said respective MAD.

23. The data synchronization system of claim 22 wherein:

said configuration control circuit compares said group TED value with said respective MAD for each of said member streams and generates a signal in response to said group TED being greater than any of said respective MAD of said member streams.

24. The data synchronization system of claim 19 wherein:

said initialization parameters further comprise a group relationship specification for a stream group including a plurality of member streams having a predetermined inter-relationship, said group relationship specification being representative of said predetermined inter-relationship;

said configuration control circuit determining said first and said second buffer configuration signals as a function of said group relationship specification and said APLR and MAD.

25. The data stream synchronization system of claim 19 wherein:

said network delay probability data comprises statistical estimates of probable packet delays.

26. The data stream synchronization system of claim 19 wherein:

said network delay distribution circuit further comprises an input for accepting an input delay value and an output for providing a calculated packet loss rate as a function of said input delay value.

27. The data stream synchronization system of claim 19 wherein:

said network delay distribution circuit further comprises an input for accepting an input packet loss rate value and said network delay distribution circuit provides a calculated delay value as a function of said input packet loss rate.

28. The data stream synchronization system of claim 19 further comprising:

a buffer delay trend detector having an input connected to said data buffer for monitoring said buffer delays of said data packets in said data buffer;

said buffer delay trend detector having an output connected to said network delay distribution circuit for providing historical network delay data;

said network delay distribution circuit responds to said historical network delay data to selectively revise said network delay probability data.

29. The data stream synchronization system of claim 19 further comprising:

a drift detector having an input connected to said data buffer circuit for monitoring trends in the utilization of said data buffer;

said drift detector detects a rate drift between a sender packet rate and a receiver packet rate, said sender packet rate being representative of the rate at which said data packets are generated by a sender and said receiver packet rate being representative of the rate at which said data packets are accepted by said one or more data receivers.

30. The data stream synchronization system of claim 29 wherein:

said drift detector monitors trends in the number of said data packets stored in said data buffer.

31. The data stream synchronization system of claim 29 wherein:

said data buffer discards or replays selected ones of said data packets at a predetermined discard or replay rate, said discard and replay rates being a function of said rate drift.

32. The data stream synchronization system of claim 29 further comprising:

an adjustable rate clock having an output connected to said receiver for providing a timing signal to synchronize said one or more receivers with said sender;

said adjustable rate clock having an input connected to said drift detector for receiving a rate drift adjustment signal representative of said rate drift and operative to adjust said timing signal to reduce said rate drift.

33. The data stream synchronization system of claim 19 wherein:

said data packets further comprise time stamp information; and said data buffer calculates said initial network delay suffered by said first data packet using said time stamp information.

34. The data stream synchronization system of claim 19 wherein:

said first data packet is a special control packet delivered to said data stream synchronization system within a guaranteed tolerance of a minimum network delay; and said data buffer stores said data packet in a buffer slot representative of a maximum buffer delay.

35. The data stream synchronization system of claim 19 wherein:

said data buffer calculates said actual network delay suffered by said first one of said data packets using network delay information provided by said network.

36. A method of synchronizing network data streams comprising the steps of:

accepting stream initialization parameters including an acceptable packet loss rate (APLR) which comprises an acceptable rate for purposefully discarding packets and a maximum acceptable delay (MAD);

calculating an operating total end-to-end delay (TED) as a function of said APLR and MAD;

initializing a buffer for accepting stream data comprising a first packet and a plurality of subsequent data packets;

determining a network delay for said first packet;

determining a buffer delay for said first packet as a function of said TED less said network delay;

storing said first packet in a buffer position associated with said buffer delay;

outputting said first packet after said buffer delay; and determining which data packets are received with a delay greater than said TED value and selectively discarding those data packets.

37. A method of synchronizing network data streams comprising the steps of:

accepting stream initialization parameters including an acceptable packet loss rate (APLR) and a maximum acceptable delay (MAD);

calculating an operating total end-to-end delay (TED) as a function of said APLR and MAD;

initializing a buffer for accepting stream data comprising a first packet and a plurality of subsequent data packets;

determining a network delay for said first packet;

determining a buffer delay for said first packet as a function of said TED less said network delay;

storing said first packet in a buffer position associated with said buffer delay;

outputting said first packet after said buffer delay;

determining buffer locations for said subsequent data packets, said subsequent packets each having a respective packet ID indicating a position within said stream;

said buffer locations being offset from one or more of said packets being stored in said buffer by a number of buffer locations commensurate with a difference in said packet IDs; and outputting said subsequent packets in accordance with said buffer locations.

* * * * *